Jan. 15, 1963     W. F. GAYRING     3,073,452
SUB FILTER SAFETY MEDIUM

Filed Feb. 25, 1957     2 Sheets-Sheet 1

INVENTOR.
WALLACE F. GAYRING
BY John P. Murphy
ATTORNEY

Jan. 15, 1963   W. F. GAYRING   3,073,452
SUB FILTER SAFETY MEDIUM
Filed Feb. 25, 1957   2 Sheets-Sheet 2

INVENTOR.
WALLACE F. GAYRING
BY John P. Murphy
ATTORNEY

United States Patent Office 3,073,452
Patented Jan. 15, 1963

3,073,452
SUB FILTER SAFETY MEDIUM
Wallace F. Gayring, Minoa, N.Y., assignor to Ward Industries Corporation, South Portland, Maine, a corporation of Delaware
Filed Feb. 25, 1957, Ser. No. 641,989
3 Claims. (Cl. 210—108)

This invention relates to the operation of a dry cleaning machine or apparatus, and the apparatus for reclaiming the solvent for re-use.

The usual dry cleaning process involves the agitation of the materials to be cleaned in a cleaning solvent, such as trichloroethylene, perchlorethylene or like solvents well known in the art, and the extraction of the solvent from a washer tank, pumped through pipes through the filter, thus conditioning the solvent for efficient and economic cleaning. In order to perform a cleaning operation of this type, the apparatus consists of a washer wheel and tank, pump and filters, where, in the regular cycle of operation, the cleaning solvent flows from the washer tank and is pumped through the filters for final conditioning of solvent re-use, and returned back to the sump tank. Although the filtration of the cleaning solvent must be repeated periodically, it will of course be understood, that the amount of cleaning which is accomplished, determines the frequency of such an operation.

Heretofore, various types of filtering devices and various types of filters have been employed for reclaiming the cleaning solvent. The filters used, as a general rule, have been a plate or bag-type provided with removable filter elements formed of suitable material, which from necessity, have to be cleaned. This results in a substantial loss of cleaning solvent, for when the filter is opened, the accumulated dirt and sludge upon the filter elements are saturated with cleaning fluid. Further, the dirt removed from the filter elements has a tendency to form slime etc. which, in time, would tend to clog the filter and thus slow the filtering operation. Filter aids have therefore been used, such as diatomaceous earth, or finely divided cellular silica of low specific gravity, such as disclosed in Patent No. 1,704,604, which aid in causing the dirt to form a porous mass on the filter which does not hinder the passage of the cleaning solvent through the filter. Further means have been provided for cleaning the filter by providing a back-wash operation into the sub-filter to separate the sludge from the solvent. However, there is a possibility of a ruptured bag in the sub-filter or leaking of sludge and dirt around worn or damaged gaskets. This, in turn, could produce plugging of the main filter bags during the back wash operation by pumping the sludge into the sump or storage tanks and finally back into the main filter bags.

This invention has for its objects the provision of a filter medium which is located with respect to the outlet of a sub-filter. This filter medium prevents solvent-laden sludge, which may have inadvertently leaked past a damaged gasket, or leaked through a possible ruptured filter bag, from being pumped into the sump tank and finally into the main solvent filter.

This filter medium, when fitted in the bottom of the sub-filter outlet, or in the outlet conduit will prevent any sludge or dirt from passing through the outlet.

A further object of this present invention is to provide means to automatically cut off the flow of solvent and sludge when a filter bag ruptures or seal failure occurs.

Further objects of this invention will appear from the following description taken in connection with the accompanying drawing in which.

In order to realize the values and advantages of the present invention, it should be understood that after the completion of the washing cycle, the cleaning solvent is extracted from the garments by suitable means such as extraction. During the washing operation, the solvent is pumped through a suitable pipe arrangement into a filter containing filter tubes or other filtering means. The filtered solvent, after passing through the filter flows back into the machine in a clean condition. When it becomes necessary to clean the filter, the solvent is pumped in a reverse direction through the filter and through a sub-filter to reclaim the solvent. As well known to those familiar in the art, very often during the reclaiming process, the sub-filter containing a filter bag or the like, may rupture due to an overload of sludge which builds up pressure therein. As a result, the loosened sludge and dirt is pumped into the sump tank.

Figure 1:
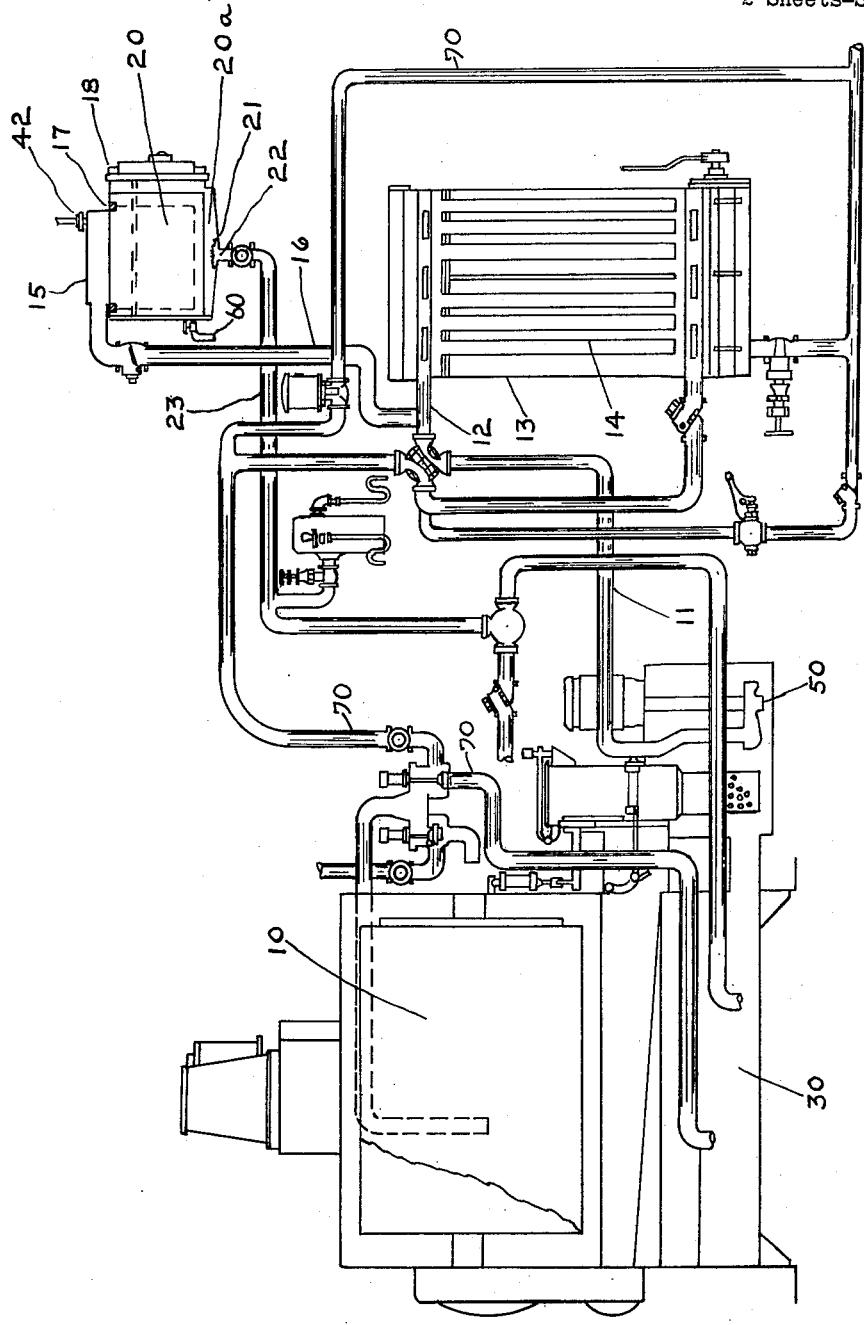
FIGURE 1 shows a plan view of a dry cleaning machine comprising the usual washer wheel and tank, pump, filter, sub-filter and sump tank. The dotted line indicates the position of the filter medium with respect to the sub-filter in the process of reclaiming the cleaning solvent.

In the present invention, with particular reference to FIGURE 1 of the drawings, when the washing cycle has been completed, the cleaning solvent is removed from the wash tank 10, by suitable means such as a pump 50 and transferred through pipe 11 having a valve arrangement, in through pipe 12 entering the filtering unit, which is designated as a whole by the reference character 13. Located within the filter 13 are filter tubes 14, or any other conventional filtering elements used for filtering the solvent, such as screens etc. As the cleaning solvent passes through these filter tubes 14, the dirt and sludge carried in the cleaning solvent becomes entrained on the filter tubes 14 together with a filter aid, as is general practice in filters used with dry cleaning solvents.

After the cleaning solvent passes through the main filter 13 it is returned to the sump tank 30, through pipe 70 for re-use in the washer wheel tank 10. However, depending upon the amount of cleaning accomplished, it becomes necessary to clean the main filter 13 in order to remove the solvent-laden sludge therefrom. This is accomplished by a back-wash operation whereby, as illustrated in FIGURE 1, the solvent is pumped in a reversed direction back through the main filter 13 into the sub-filter 15 through pipe 16. Thus, by the reverse flow of the solvent passing back through the main filter 13 into the sub-filter 15, the sludge entrained in the main filter 13 during the filtering operations is dislodged from the filter elements 14, and passed to the sub-filter 15, which receives the solvent-laden sludge and further filters the solvent before it returns to the sump tank 30 for re-use in the washer tank 10.

Figure 2:
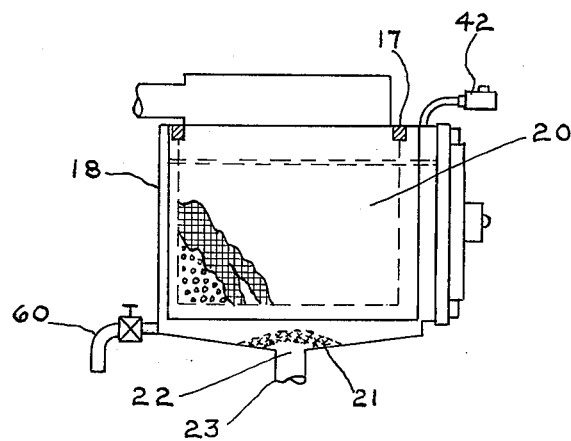
FIGURE 2 is an enlarged view of a cross-section of the sub-filter illustrating one embodiment of the present invention.

With specific reference now being made to FIGURES 1 and 2 of the drawings, the present invention embodies the placement of a safety filter medium which includes means to prevent the back flow of sludge through a ruptured sub-filter bag or past damaged seals in the sub-filter 15. It further prevents the flow of sludge and solvent into the sump tank 30 in the case of a ruptured sub-filter bag. It is herein illustrated as a strainer, which may be in the form of a screen 21 placed in the lower portion of the container 18 between the sub-filter bag 20 and an opening 22 of the connecting conduit 23 leading to the sump tank 30. The screen 31 may preferably be formed of metal. As the cleaning solvent passes from the main filter 13 into the sub-filter 15 during the back-wash operation, the solvent-laden sludge passes through the sub-filter bag 20 along with the solvent being pumped back into the sump tank 30. Thus it is seen that with the use of this safety metal screen 21, any sludge or matter which has not been entrained in the sub-filter bag 20, or which sludge may have passed through a damaged gasket, is further filtered in a restricted area, such as at the position of the metal screen 21 with respect to the outlet or opening 22. This prevents the free flow of the solvent-laden sludge through the conduit 23 which connects the sub-filter 15 to the sump tank 30. The safety filter medium 21 thus reduces the plugging of the tubes to a minimum. As a further precaution, also located in the chamber of the sub-filter 15 is a pressure-sensitive means, such as a pressure switch 42, which actuates responsive to a pressure build-up of sludge in the sub-filter 15. As the safety filter medium 21 restricts the flow of the solvent-laden sludge through opening 22 in the case of a ruptured sub-filter bag 20, and as the entrained sludge and dirt build up, the pressure switch 42, responsive to this build up, automatically stops the pump flow of the solvent, whereupon further passage of the solvent is halted. A drain outlet 60 may be provided, as illustrated in FIGURE 2, connected to the sub-filter 15, whereby upon the stopping of the flow of the solvent, the solvent-laden sludge may be drained from within the sub-filter 15. Thus it is seen, that in the case of a ruptured sub-filter bag 20, the automatic pressure switch 42 prevents the back flow of sludge through a ruptured sub-filter bag 20 or past a damaged gasket 17 in the sub-filter 15 back into the main filter 13, or on to the sump tank 30. It is thus seen, that it is possible to replace the ruptured sub-filter bag 20 or damaged gasket 17 without recleaning the entire main filter 13 and filter elements 14, or without having to refilter the solvent that has passed to the sump tank 30 with sludge entrained therein.

Figure 3:
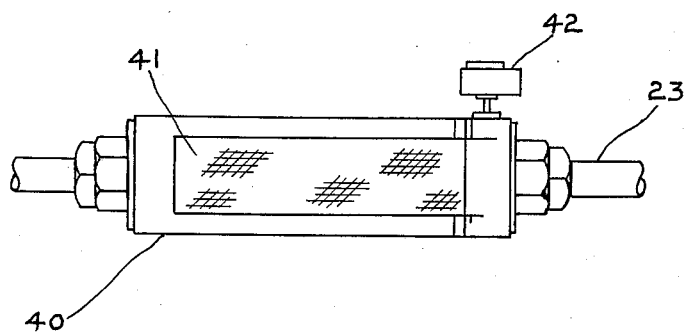
FIGURE 3 is a cross-section view of a modification of the invention showing a tube connected in the sub-filter outlet whereby any sludge-laden solvent will be caught by the bag located in the tube.

Another modification of the present invention is illustrated in FIGURE 3 and comprises an open end tube 40 which is adapted to be connected to a sub-filter 15. As illustrated in FIGURE 3, this tube 40 is connected to a sub-filter outlet 23 and has located therein a safety filter medium, such as a strainer 41 or bag 41 which catches and further filters the solvent-laden sludge passing through the sub-filter 15 during the back wash operation. A pressure responsive switch 42 is suitably attached to the tube 40. In the case of a ruptured sub-filter bag 20 or damaged gasket 17, the free flow of the sludge-laden solvent is prevented by the safety medium 41 in the tube 40, preventing the sludge from entering the sump tank 30.

As the pressure of this restricted flow of sludge-laden solvent builds up within the tube 40, the pressure switch 42, responsive to this build up, automatically shuts off the pump flow of the solvent to the sump tank 30 and prevents the back flow of the sludge-laden solvent into the main filter 13. The tube 40 may then be drained and cleaned, as hereinabove described, eliminating the complete removal of the solvent from the system, as well as the complete removal of the filter elements 14 in the main filter 13. It is also seen, that any matter which may not have been filtered in the sub-filter 15 during the back wash operation is further filtered through the safety filter medium 41 in tube 40, before the solvent returns through the connecting pipes into the sump tank 30 for re-use in the washer wheel tank 10.

The size screen mesh for screen 21 is selected accordingly with engineering practices known to those skilled in the art.

It is seen from the above disclosure, that during the reclaiming of the cleaning solvent, viz. the passage of the solvent in a reverse flow during the back wash operation from the main filter 13 in through the sub-filter 15, the reclaiming process is increased in efficiency by the use of the safety filter medium located either within the sub-filter 15 or a tube as disclosed. The use of this safety filter medium acts as a preventative measure against any sludge entering the sump tank 30 during the back wash operation in the event a filter bag 20 in the sub-filter 15 should rupture, and reduces the chances of outlets and pipes from becoming plugged. The use of the automatic pressure-sensitive means prevents the back flow of sludge into the main filter 13.

While a specific form of the invention in the improvement of the reclaiming of the cleaning solvent during the back wash operation has been described and illustrated herein, it is desired to be understood that the same may be varied, within the scope of the appended claims, without departing from the spirit of the invention.

What is claimed is:

1. In a cleaning machine having a main filter, a sub-filter connected with the main filter, and a pump for transferring solvent from the main filter to the sub-filter during the back wash operation, said sub-filter including a housing having filter means therein, an outlet extending from said housing, a filter medium mounted in said outlet whereby the outflowing solvent is further filtered therethrough during the back wash operation, and a pressure sensitive means connected to said housing and responsive to a pressure build-up between the filter means and the filter medium for stopping the pump.

2. In a cleaning machine as defined in claim 1, said filter medium comprising a metal screen.

3. In a cleaning machine as defined in claim 2, said pressure sensitive means constituting a pressure switch.

References Cited in the file of this patent

UNITED STATES PATENTS

| | | |
|---|---|---|
| 856,832 | Anderson | June 11, 1907 |
| 1,981,877 | Pierce | Nov. 27, 1934 |
| 2,359,138 | Martin | Sept. 26, 1944 |
| 2,499,494 | Greer | Mar. 4, 1950 |
| 2,729,339 | McCoy | Jan. 3, 1956 |